(12) United States Patent
Yu et al.

(10) Patent No.: US 9,015,731 B2
(45) Date of Patent: Apr. 21, 2015

(54) EVENT HANDLING SYSTEM AND METHOD

(71) Applicant: LG CNS Co., Ltd., Seoul (KR)

(72) Inventors: Hwan Ki Yu, Seoul (KR); In-hui Kim, Seoul (KR); Young Soo Choi, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 0 days.

(21) Appl. No.: 14/155,268

(22) Filed: Jan. 14, 2014

(65) Prior Publication Data

US 2014/0201762 A1 Jul. 17, 2014

(30) Foreign Application Priority Data

Jan. 15, 2013 (KR) ........................ 10-2013-0004638

(51) Int. Cl.
*G06F 9/54* (2006.01)
*H04L 29/08* (2006.01)
(52) U.S. Cl.
CPC ...................................... *G06F 9/542* (2013.01)
(58) Field of Classification Search
None
See application file for complete search history.

(56) References Cited

U.S. PATENT DOCUMENTS

| 2008/0280637 | A1* | 11/2008 | Shaffer et al. | 455/519 |
| 2011/0093568 | A1* | 4/2011 | Thomas | 709/219 |
| 2011/0173359 | A1* | 7/2011 | Chakravarty et al. | 710/112 |
| 2012/0144416 | A1* | 6/2012 | Wetzer et al. | 725/14 |
| 2012/0150859 | A1* | 6/2012 | Hu | 707/737 |
| 2013/0151690 | A1* | 6/2013 | Shah et al. | 709/224 |

FOREIGN PATENT DOCUMENTS

| KR | 10-2001-0060869 A | 7/2001 |
| KR | 10-0489690 B1 | 5/2005 |
| KR | 10-2010-0131181 A | 12/2010 |

OTHER PUBLICATIONS

Patrick Eugster et a' "Distributed Asynchronous Collections: Abstractions for Publish/Subscribe Interaction" 2000.*

* cited by examiner

*Primary Examiner* — Lechi Truong
*Assistant Examiner* — Abdou Seye

(57) ABSTRACT

An event handling system includes a standard operating procedure (SOP) engine configured to process an SOP defined for an event and transmit the event, and an event publisher configured to transmit the event transmitted from the SOP engine to a target according to a type and a connection state of the target.

17 Claims, 4 Drawing Sheets

EVENT HANDLING SYSTEM AND METHOD

CROSS-REFERENCE TO RELATED APPLICATIONS

Pursuant to 35 U.S.C. §119(a), this application claims the benefit of earlier filing date and right of priority to Korean Patent Application No. 10-2013-0004638, filed on Jan. 15, 2013, the contents of which are hereby incorporated by reference herein in their entirety.

BACKGROUND

1. Field of the Invention

The present invention relates to a technology for handling an event in a security and control system, and, more particularly, to an event handling system and method for unified event processing based on a standard operating procedure (SOP).

2. Background

Generally, a security and control system transmits a plurality of events to a plurality of target devices so that each of the target devices takes an action according to a corresponding event. The security and control system monitors and controls events gathered by the target devices in real time.

The security and control system uses an event pushing scheme. For example, the security and control system may use a web-based long polling scheme, a TCP/IP session pushing scheme, or a mobile-based TCP/IP session pushing scheme as the event pushing scheme. The type of event pushing scheme may be determined according to a user and a process necessary to push an event to a corresponding target device. A conventional event transmission technology may provide a plurality of clients or an anonymous browser with a service such as a polling service, a long polling service, or a streaming service.

In the polling service, even if an event occurs in a server, the server does not transmit the event to the anonymous browser or a client if there is no request message from the browser or the client. If the server receives a request message from the browser or the client, the server transmits the event as a response message to the browser or the client.

In the long polling service, if an event does not occur in a server, the server does not transmit a response message to a browser or a client even if the browser or the client transmits a request message to the server. If an event does occur and the server receives a request message from the browser or the client, the server transmits the event as a response message to the browser or the client.

In the streaming service, once a server receives a request message from a browser or a client, the server transmits a response message to the browser or the client whenever an event occurs.

However, since a relatively large number of events occur in a typical security and control system, it is difficult to implement event transmitters to handle all of the events. In addition, since a typical event transmission schemes such as a web or mobile scheme do not consider various connection states of target devices, they cannot guarantee the transmission of an event to a destination, i.e., the target device.

The Korean Publication Patent No. 2001-0060869 relates to an event handling method by a request of an operator in a communication system. The event handling method provides a technology of managing data indicating a state of an event in the communication system, detecting an event using a polling mode or an interrupt mode in a single device, and performing polling with reference to a duration, a priority, and the number of occurrences of events when detecting an event using the polling mode. In the event handling method of the communication system, event information is received from an operator while the communication system operates to update an event state table. Events are detected from the event state table using a polling scheme for events whose detection scheme is performed in the polling mode. Events are detected from the event state table using an interrupt scheme for events whose detection scheme is performed in the interrupt mode. Therefore, in a device in which there is a plurality of events, it is possible to flexibly manage events in response to a request of an operator even while the device is operating.

The Korean Registration Patent No. 10-0489690 relates to a method of modeling a database table for real-time alarm control and processing an event. The method is provided to use a single waitlist table, a table for managing a state of a connected client, and a daemon monitoring technique for managing waitlist data and a list of connected clients, thereby improving an alarm information processing speed. In the technique, a database is used for storing or processing alarm information. A daemon processor maps current alarm information accumulated in a waitlist table to a reading alarm sequence number of a client list, manages a current alarm list within the waitlist table, and perceives a state of the client list by a final polling time and the alarm sequence number, and then manages an abnormally completed client. When an alarm event is generated from system equipment, the alarm event is transmitted to an alarm management processor of a server. The alarm management processor stores alarm information in the database.

However, such conventional event handling techniques require transmission that depends on an on-line connection environment of a plurality of event transmission targets. Such methods do not consider the actual connection environment of an individual transmission target at the time the event occurs, and thus transmission of the event is not sufficiently guaranteed. In addition, since the life cycle of the event is not managed, the accuracy of an event processing procedure for an important event is deteriorated. These methods cannot process a large number of events and do not have a procedure for managing the events.

Such conventional event handling techniques do not provide a unified process interface to process an important event and do not take into consideration the occurrence of a large number of events exceeding that of a typical transaction.

In other words, the conventional event handling techniques focus on transmitting a unified push at a point in time when an event occurs, but do not provide a reliable and intelligent event transmission method when there is variation in a connection environment.

SUMMARY

An embodiment of the present invention is directed to an event handling system and method for uniformly processing events based on a standard operating procedure (SOP).

An embodiment of the present invention is directed to an event handling system and method for managing a life cycle of an event using an SOP engine and processing the event using a task-oriented unified interface.

An embodiment of the present invention is directed to an event handling system and method for processing a large number of events and providing an event re-processing procedure.

An embodiment of the present invention is directed to an event handling system and method for transmitting an event stored based on an in-memory grid by considering a connection environment of a target.

In accordance with an embodiment, an event handling system includes an SOP (Standard Operating Procedure) engine configured to process an SOP defined per event and transmit an event and an event publisher configured to transmit the event transmitted by the SOP engine according to a type and connection state of a target.

The SOP engine may automate the SOP for standardizing a business handling procedure based on a priority, the business handling procedure being common procedure for handling a plurality of events.

The SOP engine may include an SOP process unit configured to process an SOP for an event being defined by a user based on a business process, an SOP task unit configured to handle an action of the event with the SOP and an event sender unit configured to designate the target to transmit the event to the event publisher.

The event publisher may include an event repository unit, an event receiver unit configured to register a key and a value of the event transmitted from the SOP engine into the event repository unit, a cluster manager unit configured to manage a cluster of an event publisher repository in the event repository unit and an event distributor unit configured to detect a priority for the registered event, a connection state of the target to distribute the event according to the connection state of the target and a sender unit configured to use a push message being optimized by the event distributor unit to send the event to the target.

The sender unit may include a web sender unit configured to push the event by using a TCP/IP session and a javascript based server side script, a mobile sender unit configured to push the event by using a TCP/IP session with an individual device, an RIA (Rich Internet Application) sender unit configured to push the event by using a streaming AMF (Action Message Format) and a web socket; and a message sender unit configured to push the event by using an API (Application Program Interface).

The event publisher may further include a scheduler configured to manage the event being periodically transmitted.

In accordance with another embodiment, an event handling method includes processing an SOP defined per event through an SOP engine and transmitting the event and transmitting the event received from the SOP engine through an event publisher according to a type and connection state of a target.

Processing the SOP and transmitting the event may include checking whether an event transmitted to the SOP engine is an SOP defined event, automatically calling an SOP process corresponding to the event when the event transmitted to the SOP engine is the SOP defined event to handle the SOP process, checking whether an SOP sub-task in the SOP process exists to handle the SOP sub-task and checking whether an event transmission is instructed to designate the target, to transmit the event transmitted to the SOP engine to the event publisher.

Processing the SOP and transmitting the event may include checking a completion of progressing the SOP task when the event transmission is not instructed.

Processing the SOP and transmitting the event may include checking whether a progress of the SOP process is completed when the SOP sub-process does not exist or the SOP task is completed.

Transmitting the event according to the type and connection state of the target may include registering the target and the event received from the SOP engine, determining a priority of the event and a current connection state of the target by using an event driven model at a registration time of the event, distributing the event according to the determined priority and the current connection state and pushing the distributed event based on the current connection state of the target.

Registering the target and the transmission event may include receiving a connection state pre-defined by the target and registering the received connection state and the event at the same time.

Registering the target and the event may include simultaneously registering the event in a plurality of connection environments. Registering the target and the event may include registering a priority according to an importance of the event.

Pushing the distributed event may include transmitting the distributed event to the target by using a web socket and a server side javascript for a web based target, a TCP/IP session with a device, a streaming AMF and a web socket or an API.

Transmitting the event according to the type and connection state of the target may include checking whether the distributed event is transmitted and periodically managing the distributed event to re-transmit the distributed event when the distributed event fails to be transmitted.

An event handling system and method according to an embodiment of the present invention may manage a life cycle of an event through an SOP engine and may provide a task-oriented unified handling interface for processing an event to support task automation for processing an event and secure the accuracy for an event handling process.

An event handling system and method according to an embodiment of the present invention may transmit an event stored based on an in-memory grid using a pushing scheme determined based on a connection state of a target at a transmission point of time of the event to improve event transmission performance.

An event handling system and method according to an embodiment of the present invention may provide architecture for processing a large number of events and providing an event re-processing procedure to smoothly handle the large number of events.

BRIEF DESCRIPTION OF THE DRAWINGS

The above and other objects and features of the present invention will become apparent from the following description of embodiments given in conjunction with the accompanying drawings, in which.

DETAILED DESCRIPTION

Figure 1A:
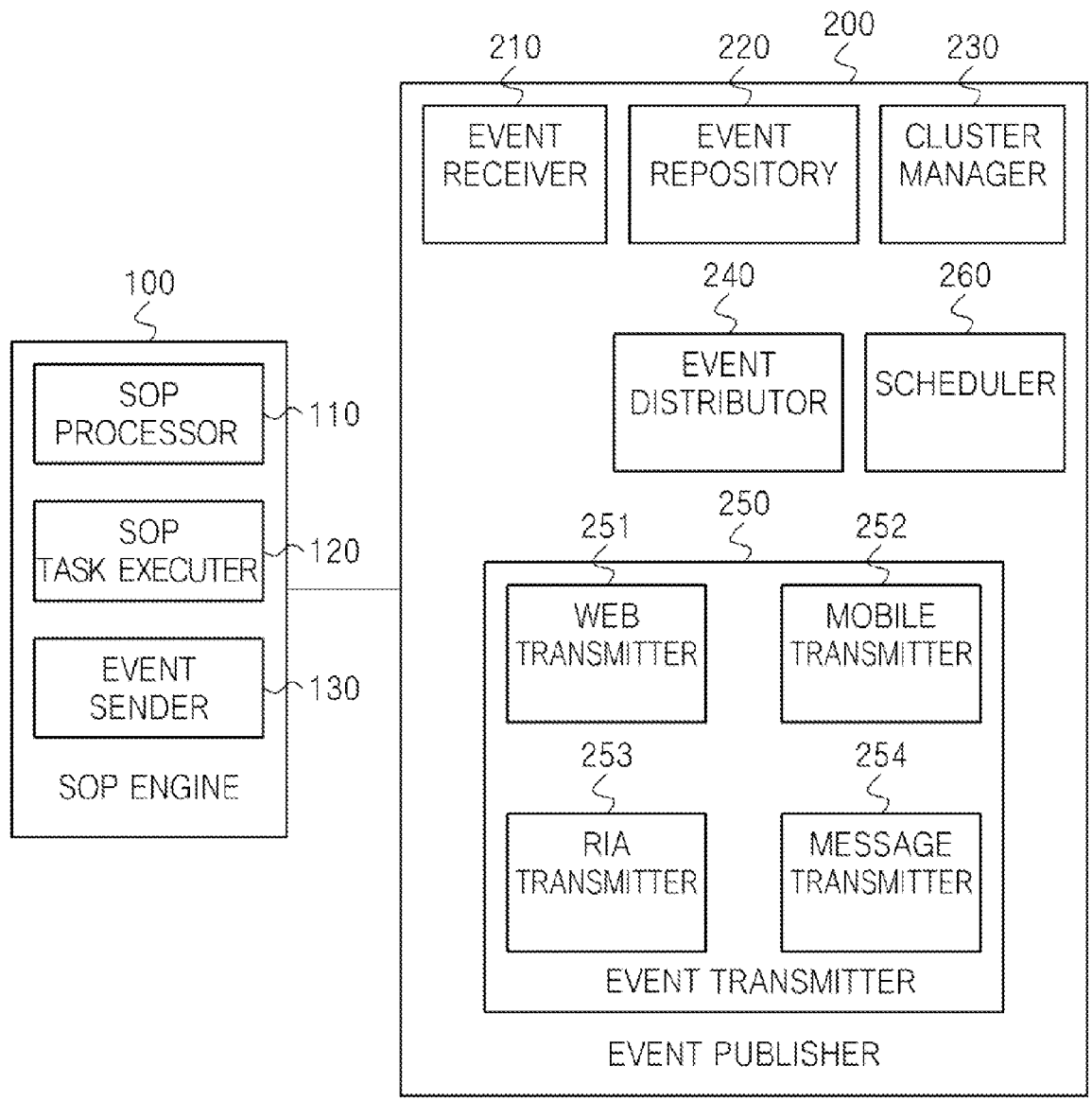
FIG. 1A is a block diagram illustrating an event handling system according to an embodiment of the present invention.

Descriptions of embodiments of the present invention provide structural and functional explanations. The scope of the present invention should not be limited to the embodiments described in the present disclosure. That is, since embodiments may be implemented in several forms without departing from the spirit and scope of the present invention, it will be understood that embodiments of the present invention are not limited by details of the descriptions provided herein, unless otherwise specified. Rather, embodiments of the present invention should be construed broadly within the scope defined by the appended claims. Therefore, various changes and modifications that fall within the scope of the claims, or equivalents of such scope, are intended to be embraced by the appended claims.

Terms described in the present disclosure may be understood as follows.

While terms such as "first" and "second," etc., may be used to describe various components, such components are not limited by these terms. The above terms are used only to distinguish one component from another. For example, a first component may be referred to as a second component without departing from the scope of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Other expressions describing relationships between components such as " between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not limit the order of respective steps. The respective steps may be changed from a mentioned order unless specifically mentioned in context. Namely, respective steps may be performed in the same order as described, may be substantially simultaneously performed, or may be performed in a different order.

In describing elements of the present invention, terms such as first, second, A, B, (a), (b), etc., may be used. Such terms are used for discriminating corresponding elements from other elements, and the corresponding elements are not limited in their essence, sequence, or precedence by the terms.

The terms used in the present disclosure are merely used to describe particular embodiments, and are not intended to limit the present invention. Unless otherwise indicated, all terms used herein, including technical or scientific terms, have the same meanings as those generally understood by those with ordinary knowledge in the field or art to which the present invention belongs.

FIG. 1A is a block diagram illustrating an event handling system according to an embodiment of the present invention.

Referring to FIG. 1A, the event handling system includes a standard operating procedure (SOP) engine 100 and an event publisher 200.

The event handling system integrates an event processing procedure in a unified interface to manage transmission of an event and a life cycle of the event, and provides an architecture capable of processing a large number of events. The event handling system also provides integrated event transmitters capable of automatically distributing a plurality of events according to an importance thereof, detecting connection states of targets, and transmitting each of the plurality of events to a corresponding final destination, i.e., a corresponding target.

The SOP engine 100 performs an automated task processing procedure according to an event flow. The SOP engine 100 automates an SOP according to priorities of events received by a device and an internal system. The SOP engine 100 transmits the events to the event publisher 200, while providing a unified handling interface and a business logic to maintain consistency in processing tasks. That is, the SOP engine 100 provides an SOP to be performed when the events are received, and provides the SOP to an administrator.

The SOP engine 100 includes an SOP processor 110, an SOP task executer 120, and an event sender 130.

The SOP processor 110 processes an event according to an SOP for the event, which is defined by a user, based on a basic task process predefined in a memory.

The SOP task executer 120 performs an action corresponding to the event as a task that is processed according to the SOP for the event.

The event sender 130 designates a target device and instructs the event publisher 200 to transmit the event to the target device.

The event publisher 200 has a configuration that uses an event-driven model, an in-memory grid, and a multi-channel transmitter to process a large number of events. The event publisher 200 transmits a task being automatically processed through an SOP-based service of the SOP engine 100 and an event to a target according to a type and a connection state of the target.

The event publisher 200 includes an event receiver 210, an event repository 220, a cluster manager 230, an event distributor 240, and an event transmitter 250.

The event receiver 210 receives an event to be transmitted to a target in an SOP-based business logic and registers the event in the form of a key and a value into the event repository 220.

The event repository 220 temporarily stores the key and the value of the event into a memory therein before transmitting the event to the target. The event repository 220 may automatically store an event using a key-value based in-memory grid. The in-memory grid is a scheme of distributing and storing data into a memory to guarantee memory scalability.

In more detail, according to the in-memory grid, data is distributed and temporarily stored by using keys and values. As a result, it is possible to process a large amount of data exceeding the maximum capacity of a main memory and to prevent data loss when an error occurs. The in-memory grid may provide a client library through which the in-memory grid is implemented.

The cluster manager 230 manages a cluster configuration of an event publisher repository in the event repository 220 to transmit a large number of events.

The event distributor 240 distributes an event stored in the event repository 220 based on a current connection state and a position of a target. That is, the event distributor 240 individually determines a priority of an event received by the event receiver 210, recognizes a connection state of a target at a transmission time of the event, and provides the event to an appropriate transmitter in the event transmitter 250. As a result, transmission of the event is optimized according to, e.g., the connection state of the target.

The event transmitter 250 pushes the event distributed by the event distributor 240 to the target using a pushing scheme optimized according to, e.g., the connection state of the target.

The event transmitter 250 includes one or more of a web transmitter 251, a mobile transmitter 252, a rich internet application (RIA) transmitter 253, and a message transmitter 254.

The web transmitter 251 transmits the event to a web-based application using a TCP/IP session and a javascript-based server-side script.

The mobile transmitter 252 transmits the event to a mobile application using a TCP/IP session.

The RIA transmitter 253 is an event transmitter implemented with a streaming action message format (AMF) and a web socket, and transmits the event to an RIA of FLEX and HTML5.

The message transmitter 254 is an event transmitter implemented with an application program interface (API) for various targets, such as a mail, a short message service (SMS) and a social network service (SNS), and transmits the event using the API.

The event handling system provides a handling interface unified by an SOP, manages life cycles of events, automatically stores the events in the event repository 220 using the key-value based in-memory grid, distributes the events using the event distributor 240, and provides the real-time push transmitter 250 that operates by detecting connection states of targets. As a result, the event handling system can enhance the transmission reliability of the events.

In an embodiment, the event publisher 200 further includes a scheduler 260. The scheduler 260 periodically manages an event that should be, but has not been, transmitted. That is, the scheduler 260 ensures that the event is periodically reprocessed so that the event distributor 240 distributes the event.

Figure 1B:
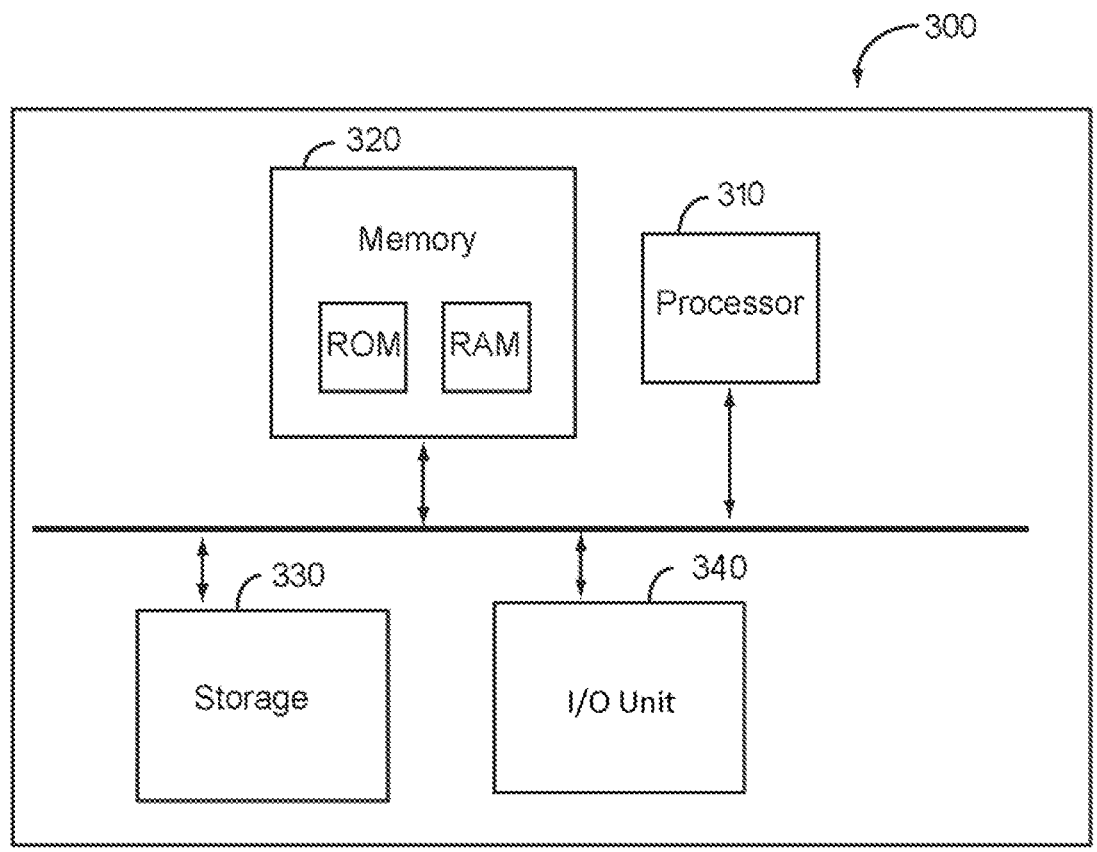
FIG. 1B illustrates a hardware configuration of an event handling system according to an embodiment of the present invention.

In an embodiment, the components illustrated in FIG. 1A are implemented by general hardware structures, such as a processor 310, a memory 320, a storage 330, and an input/output (I/O) unit 340 in a computer system as shown in FIG. 1B, and application program software cooperating with these hardware structures. A detailed description of the components shown in FIG. 1B are omitted herein for the simplicity of explanation.

Figure 2:
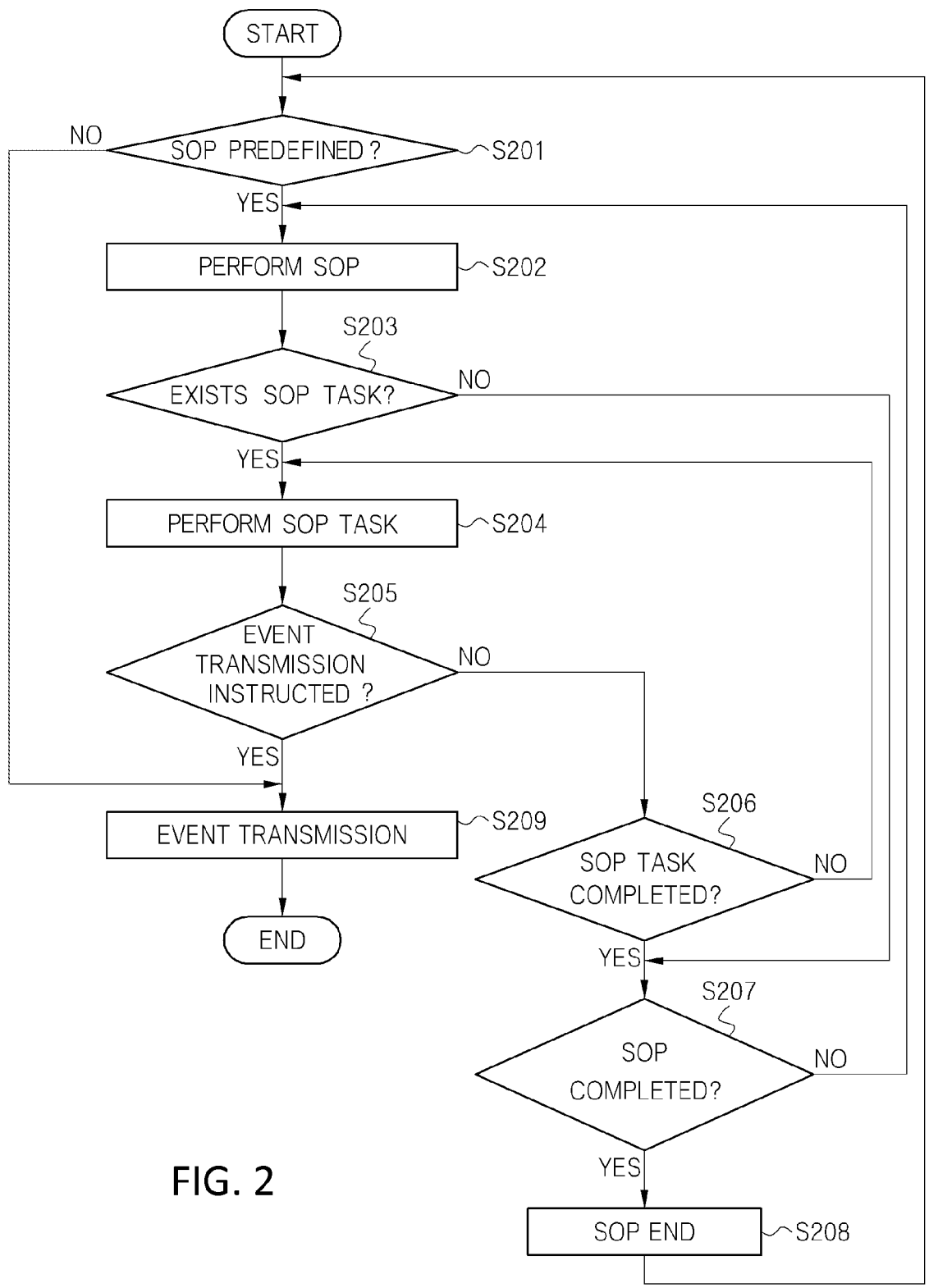
FIG. 2 and FIG. 3 are flow charts illustrating an event handling method according to an embodiment of the present invention.
Figure 3:
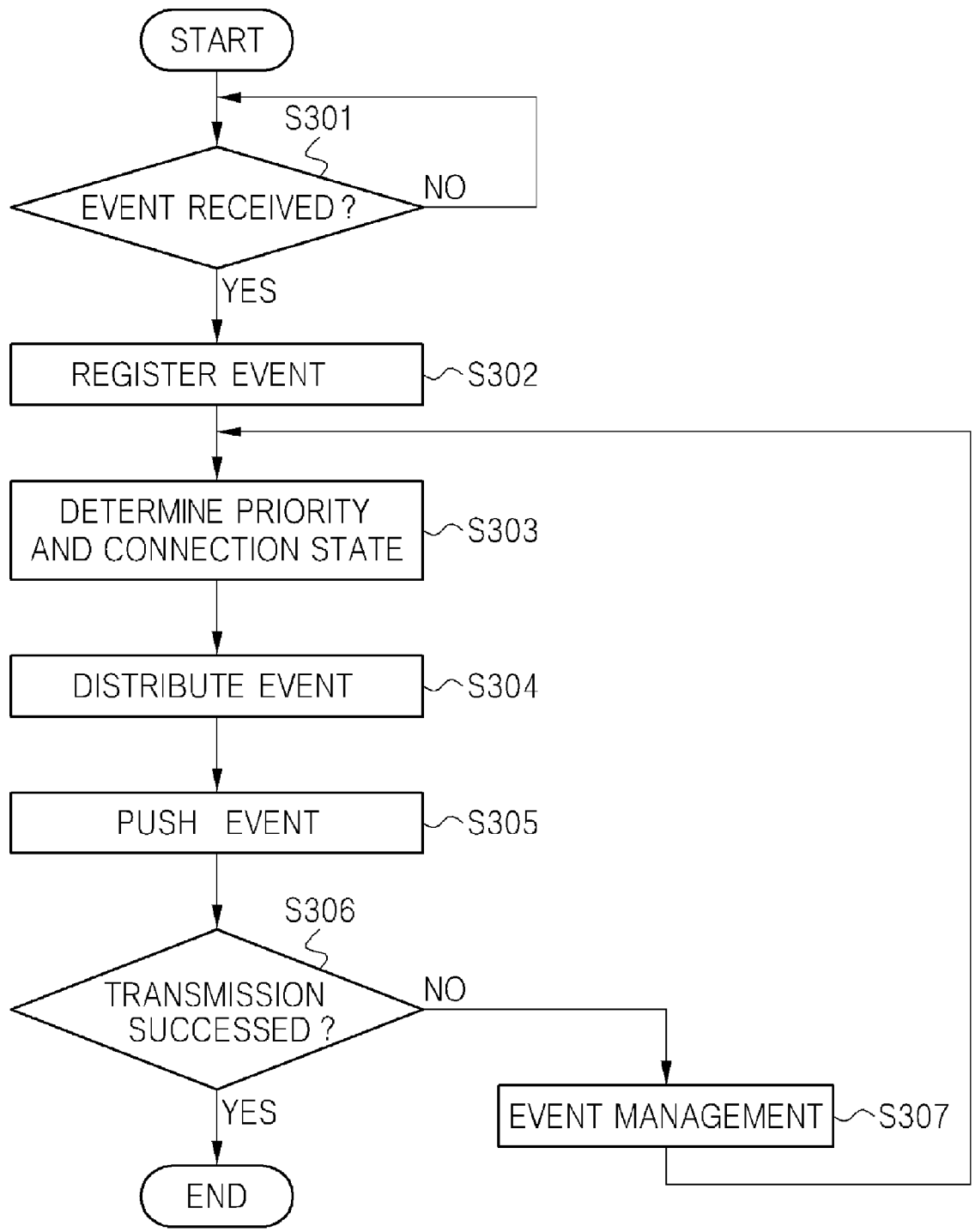

FIG. 2 and FIG. 3 are flowcharts illustrating an event handling procedure according to an embodiment of the present invention. FIG. 2 is a flowchart illustrating an operation of the SOP engine 100 in FIG. 1A according to an embodiment of the present invention.

The SOP engine 100 is an automation system that provides an SOP for a plurality of events, and provides the SOP to an administrator when the plurality of events is received by a control target device or an internal security and control system. The SOP for the plurality of events is predefined by a user according to an importance of the events.

If the control target device or the internal security and control system receives an event, a predefined SOP corresponding to the event is automatically called and performed by the SOP engine 100.

The SOP processor 110 receives the event and determines whether the received event is an SOP defined event, i.e., an event for which an SOP is predefined by a user, in step S201. If it is determined that the received event is an SOP defined event, the SOP for the received event is performed based on a basic task process in step S202. The SOP for an event may include a single task, or may include a plurality of sub-tasks.

The SOP engine 100 processes a task of the SOP based on a standard task process.

For this purpose, the SOP task executer 120 checks whether the task of the SOP processed in the SOP processor 110 exists in step S203. If it is determined that a task of the SOP exists, the SOP task executer 120 performs an action of the received event, i.e., the SOP task, in step S204.

After that, the event sender 130 designates a target and transmits the received event to the event publisher 200. Before transmitting the received event to the event publisher 200, the event sender 130 checks whether there is an instruction for event transmission in step S205. In an embodiment, the event transmission instruction includes a designation of the target and an instruction to transmit the event to the event publisher 200.

If it is determined that there is no instruction for event transmission in step S205, the SOP task executer 120 checks whether or not the action of the received event, i.e., the SOP task, is completed in step S206. If it is determined that the SOP task is not completed in step S206, the procedure goes back to step S204 so that the SOP task executer 120 perform the SOP task.

If it is determined that the SOP task does not exist in step S203 or that the SOP task is completed in step S206, the SOP processor 110 checks whether or not the entire SOP for the received event is completed in step S207.

If it is determined that the entire SOP is not completed in step S207, the procedure goes back to step S202 so that the SOP processor 110 continues to process the SOP for the received event. On the other hand, if it is determined that the SOP for the received event is completed in step S207, the SOP processor 110 terminates the SOP in step S208, and the procedure goes back to step S201 to check whether or not the next event is an SOP defined event.

When the SOP for the received event is completed, the SOP processor 110 terminates a system control task for the received event, and thus a life cycle of the received event is terminated.

The SOP engine 100 corresponding to an automated SOP management system systematically processes a life cycle of an event as shown in FIG. 2. Herein, the SOP is a standard task processing procedure registered for a single event. The SOP automatically starts at a point in time when the event is received and is completed at a point in time when an administrator instructs or when a specific condition is achieved. Also, the SOP task includes information effectively transmitting the event to an internal or external task system. The event publisher 200 is used to effectively transmit the event to the target.

If it is determined that the received event is not an SOP defined event in step S201 or the event transmission is instructed in step S205, the event sender 130 designates the target and transmits the received event to the event publisher 200 in step S209.

FIG. 3 is a flowchart illustrating an operation of the event publisher 200 in FIG. 1A according to an embodiment of the present invention.

In this embodiment, the event publisher 200 is an SOP-based event publisher.

The event receiver 210 receives an event transmitted from the SOP engine 100 in step S301. The event receiver 210 may receive information for a target and the event. The target information may include, for example, identification information of the target, information regarding a connection state of the target, type information of the target information, etc. The event may include a key and a value of the event. The gathered event and target information are registered in the event repository 220 in step 302. In an embodiment, the event repository 220 includes an in-memory grid event repository that temporarily stores the event gathered by the event receiver 210 and the information for the target.

The event receiver 210 may register the event so that the registered event is transmitted without a priority in various connection states or may register the event to have a priority. If the event is registered to have a priority, the event is transmitted according to the importance of the event.

The cluster manager 230 manages a cluster configuration of a repository of the event publisher 200 to transmit a large number of events. The scheduler 260 periodically manages an event that should be transmitted, and causes the event distributor 240 to transmit the event.

The event distributor 240 operates when the event is registered in the event repository 220. The event distributor 240 determines a priority of the event and a current connection state of the target in step S303, and distributes the event to an appropriate transmitter in the event transmitter 250 according to the determined connection state of the target in step S304.

The event transmitter 250 effectively pushes the event according to, e.g., the connection state and position of the target. That is, the event transmitter 250 pushes the event, which is distributed by the event distributor 240, in a different manner depending on the target in step S305.

The event transmitter 250 includes the web transmitter 251 using a web socket and a server side javascript for a web-based target, the mobile transmitter 252 using a TCP/IP session, the RIA transmitter 253 using a streaming AMF and a web socket for an RIA client of Flex and HTML5, and the message transmitter 254 using an API defined for transmitting the event via SMS, mail, or SNS. The event transmitter 250 provides a push service optimized for the connection state of the target using the transmitters 251 through 254.

After that, in step S306, the scheduler 260 checks whether or not the event has been transmitted properly. If it is determined that the event has not been transmitted in step S306, in step S307, the scheduler 260 periodically re-processes the event, and causes the event distributor 240 to transmit the event. Then, the procedure goes back to step S303.

If it is determined that the event is successfully transmitted in step S306, the procedure is terminated. As a result, the transmission of the event, which has been processed based on a corresponding SOP, is to the target is optimized.

Methods in accordance with an embodiment have been described above based on the flowcharts shown in FIGS. 2 and 3, which include sequential steps. However, the present invention is not limited to the foregoing order of the steps, and some may be performed in a different order or performed simultaneously. Also, a person skilled in the art will understand that the foregoing steps are not exclusive, but may include other steps, or one or more steps may be omitted without affecting the scope of the present invention. An event handling method according to an embodiment of the present invention may overcome limitations of a conventional technology, which is not suitable for transmitting a large number of events.

In particular, an event handling method according to an embodiment automates performance of an SOP based on the priority of an event, determines a connection state of a target using an event publisher 200 when the event is transmitted, and selects one of a plurality of transmitters 251 through 254 based on the connection state of the target. An event handling method according to an embodiment provides an event-driven model, an in-memory grid repository, and a multi-channel transmitter. By using a push transmitter optimized for a particular target, it is possible to improve an automated process for life cycle management for an event and reliability of transmission of the event.

An event handling method according to an embodiment provides an automated control process using an SOP and an event pushing scheme based on a long polling scheme, a streaming scheme, and a TCP/IP session scheme. The event handling method provides an event handling procedure automatically processed by an SOP engine and provides a basis and a method for processing a large number of events. Also, the event handling method provides various pushing schemes for transmitting an event stored based on an in-memory grid to a target according to a connection state of the target.

That is, an embodiment of the present invention provides an SOP-based event publisher using an in-memory grid. The event publisher gathers and handles an event based on an SOP, stores the event based on the in-memory grid, detects a connection state of a target, and distributes the event to the target using a proper pushing scheme. As a result, it is possible accurately transmit an important event to a plurality of targets when processing a control and monitoring task.

Although the present disclosure provides descriptions of embodiments of the present invention, it will be understood by those skilled in the art that embodiments of the present invention can be modified or changed in various ways without departing from the technical principles and scope defined by the appended claims.

What is claimed is:

1. An event handling system in a security and control event system, comprising:
    a standard operating procedure (SOP) engine configured to process an SOP defined for an event and transmit the event; and
    an event publisher including a multi-channel transmitter, the event publisher being configured to receive the event from the SOP engine, determine an optimized pushing scheme based on a connection state of a target device, and selectively transmit the event to the target device using the corresponding optimized pushing scheme of a plurality of pushing schemes,
    wherein the SOP engine is configured to:
        check whether or not the event is an SOP defined event for which an SOP is defined;
        automatically call the SOP corresponding to the event if the event is determined to be the SOP defined event;
        check whether or not an SOP task exists in the SOP;
        perform the SOP task if it is determined that the SOP task exists; and
        check whether or not there is an event transmission instruction, the event transmission instruction including a designation of the target device and an instruction to transmit the event to the event publisher; and
        transmit the event to the event publisher if there is the event transmission instruction.

2. The event handling system of claim 1, wherein the SOP engine is configured to automate a task of the SOP to standardize a task handling procedure based on priorities of a plurality of events, the task handling procedure being commonly applicable to the plurality of events.

3. The event handling system of claim 1, wherein the SOP engine includes:
    an SOP processor configured to process the SOP for the event, the SOP being defined by a user based on a basic task process;
    an SOP task executer configured to perform a task corresponding to the event using the SOP; and
    an event sender configured to designate the target device and transmit the event to the event publisher.

4. The event handling system of claim 1, wherein the event publisher includes:

an event repository;

an event receiver configured to receive the event from the SOP engine and register a key and a value of the event into the event repository;

a cluster manager configured to manage an event cluster of the event publisher repository; and an event distributor configured to detect a priority of the event and the connection state of the target device, determine the optimized pushing scheme based on the connection state of the target device, and selectively provide the event to a corresponding transmitter of the multichannel transmitter.

5. The event handling system of claim 4, wherein the event transmitter includes:

a web transmitter configured to push the event to a web-based target device using a TCP/IP session and a javascript-based server side script;

a mobile transmitter configured to push the event to a mobile target device using a TCP/IP session;

a rich internet application (RIA) transmitter configured to push the event to an RIA using a streaming action message format (AMF) and a web socket; and a message transmitter configured to push the event to a target device using an application program interface (API).

6. The event handling system of claim 4, wherein the event publisher further includes a scheduler configured to manage the event by periodically re-processing the event until the event is successfully transmitted.

7. An event handling method in a security and control event system, the method comprising:

processing an SOP defined for an event and transmitting the event, by an SOP engine;

receiving, by an event publisher, the event from the SOP engine;

determining, by the event publisher, an optimized pushing scheme based on a connection state of a target device; and selectively transmitting, by the event publisher, the event to the target device using the optimized pushing scheme of a plurality of pushing schemes, wherein processing the SOP includes:

checking whether or not the event is an SOP defined event for which an SOP is defined;

automatically calling the SOP corresponding to the event if the event is determined to be the SOP defined event;

checking whether or not an SOP task exists in the SOP;

performing the SOP task if it is determined that the SOP task exists: and checking whether or not there is an event transmission instruction, the event transmission instruction including a designation of the target device and an instruction to transmit the event to the event publisher; and transmitting the event to the event publisher if there is the event transmission instruction.

8. The event handling method of claim 7, wherein processing the SOP further includes checking whether or not the SOP task is completed if there is no event transmission instruction.

9. The event handling method of claim 8, wherein processing the SOP further includes checking whether or not the SOP is completed if the SOP task does not exist or the SOP task is completed.

10. The event handling method of claim 7, wherein selectively transmitting the event to the target device includes:

registering information of the target device and the event received from the SOP engine;

determining a priority of the event and the current connection state of the target device when the event is registered;

distributing the event according to the determined priority and the current connection state of the target device; and pushing the distributed event using the optimized pushing scheme determined based on the current connection state of the target device.

11. The event handling method of claim 10, wherein registering the information of the target device and the event includes:

receiving the connection state of the target device as the information of the target device; and registering the received connection state and the event at the same time.

12. The event handling method of claim 10, wherein registering the information of the target device and the event includes registering the event so that the event is transmitted without a priority in a plurality of connection environments.

13. The event handling method of claim 10, wherein registering the information of the target device and the event includes registering the event to have a priority according to an importance of the event.

14. The event handling method of claim 10, wherein pushing the distributed event includes transmitting the distributed event to the target device using at least one of a web socket, a server side javascript, a TCP/IP session, a streaming action message format (AMF), and an application program interface (API).

15. The event handling method of claim 10, wherein selectively transmitting the event to the target device further includes:

checking whether or not the distributed event is transmitted; and managing the distributed event to re-process and transmit the distributed event if transmission of the distributed event fails.

16. The event handling method of claim 7, wherein the SOP is defined based on a basic task process.

17. The event handling method of claim 7, wherein processing the SOP includes automating a task of the SOP to standardize a task handling procedure based on priorities of a plurality of events, the task handling procedure being commonly applicable to the plurality of events.

* * * * *